US009929777B2

(12) United States Patent
Jaskolski et al.

(10) Patent No.: US 9,929,777 B2
(45) Date of Patent: Mar. 27, 2018

(54) METHOD FOR MODIFYING A BARRIER IN AN INDUCTION POWER AND/OR DATA TRANSFER SYSTEM TO IMPROVE POWER TRANSFER EFFICIENCY

(75) Inventors: Corey Jaskolski, Severance, CO (US); John J. Mulholland, Dunfermline (GB); Daniel McStay, Aberdeenshire (GB)

(73) Assignee: FMC Technologies, Inc., Houston, TX (US)

( * ) Notice: Subject to any disclaimer, the term of this patent is extended or adjusted under 35 U.S.C. 154(b) by 849 days.

(21) Appl. No.: 14/129,077

(22) PCT Filed: Jul. 11, 2011

(86) PCT No.: PCT/US2011/001212
§ 371 (c)(1),
(2), (4) Date: May 15, 2014

(87) PCT Pub. No.: WO2013/009276
PCT Pub. Date: Jan. 17, 2013

(65) Prior Publication Data
US 2014/0265613 A1  Sep. 18, 2014

(51) Int. Cl.
*H02J 50/10* (2016.01)
*H04B 5/00* (2006.01)
*H02J 7/02* (2016.01)
*H02J 17/00* (2006.01)
*H02J 5/00* (2016.01)

(52) U.S. Cl.
CPC ............ *H04B 5/0037* (2013.01); *H02J 5/005* (2013.01); *H02J 7/025* (2013.01); *H02J 17/00* (2013.01); *H02J 50/10* (2016.02)

(58) Field of Classification Search
None
See application file for complete search history.

(56) References Cited

U.S. PATENT DOCUMENTS

| 4,262,275 A * | 4/1981 | DeMarco ............... G01R 33/07 323/368 |
| 4,761,724 A | 8/1988 | Brown et al. |
| 6,870,475 B2 | 3/2005 | Fitch et al. |
| 2003/0076096 A1 | 4/2003 | Lourens et al. |

(Continued)

FOREIGN PATENT DOCUMENTS

GB  2 455 628 A  6/2009

*Primary Examiner* — Rexford Barnie
*Assistant Examiner* — Swarna N Chowdhuri
(74) *Attorney, Agent, or Firm* — Henry C. Query, Jr.

(57) ABSTRACT

A method for increasing the power transfer efficiency of a wireless induction power and/or data transfer system comprising a magnetic field transmitter which is positioned on a first side of a barrier and a magnetic field receiver which is positioned on a second side of the barrier opposite the first side comprises the steps of disposing at least one flux flow member in or adjacent the barrier at least partially between the transmitter and the receiver. The flux flow member comprises a magnetic permeability different from the magnetic permeability of the barrier. As a result, the flux flow member increases the amount of magnetic flux generated by the transmitter which is coupled through the barrier and into the receiver.

32 Claims, 8 Drawing Sheets

(56) References Cited

U.S. PATENT DOCUMENTS

| | | | |
|---|---|---|---|
| 2009/0156119 A1* | 6/2009 | Rhodes | H01F 38/14 |
| | | | 455/41.1 |
| 2011/0050382 A1* | 3/2011 | Baarman | H01F 1/26 |
| | | | 336/221 |
| 2011/0115429 A1 | 5/2011 | Toivola et al. | |
| 2011/0133568 A1 | 6/2011 | Wang et al. | |

* cited by examiner

METHOD FOR MODIFYING A BARRIER IN AN INDUCTION POWER AND/OR DATA TRANSFER SYSTEM TO IMPROVE POWER TRANSFER EFFICIENCY

BACKGROUND OF THE INVENTION

The present invention relates to a magnetic induction system for wirelessly transmitting power and/or data through a barrier. More particularly, the invention relates to a method for mechanically modifying the barrier to improve the flow of magnetic flux from the magnetic field transmitter to the magnetic field receiver to thereby increase the power transfer efficiency of the system.

Figure 1:
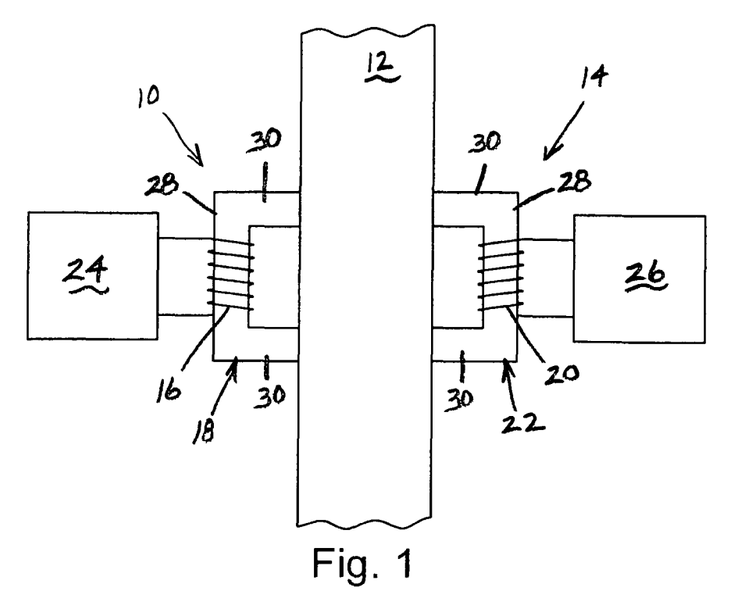
FIG. 1 is a schematic representation of an illustrative prior art wireless induction power and/or data transfer system shown positioned across a exemplary barrier.

Systems which employ magnetic induction to wirelessly transmit power and data signals through barriers are known in the art. Referring to FIG. 1, such induction power and data transfer systems commonly include a magnetic field transmitter 10 which is positioned on one side of a barrier 12 and a magnetic field receiver 14 which is positioned on the opposite side of the barrier. The magnetic field transmitter 10 typically includes a transmitter coil 16 which is wound around a transmitter core 18 and the magnetic field receiver 14 usually includes a receiver coil 20 which is wound around a receiver core 22. The transmitter 10 is connected to a signal generator 24 which when activated generates a time varying current that flows through the transmitter coil 16. The flow of current through the transmitter coil 16 generates a time varying magnetic field which in theory flows through the barrier 12 to the receiver 14. At the receiver 14, the time varying magnetic field flows through the receiver core 22 and causes a current to flow through the receiver coil 20 which may then be used to power a device 26 that is connected to the receiver coil.

Figure 2:
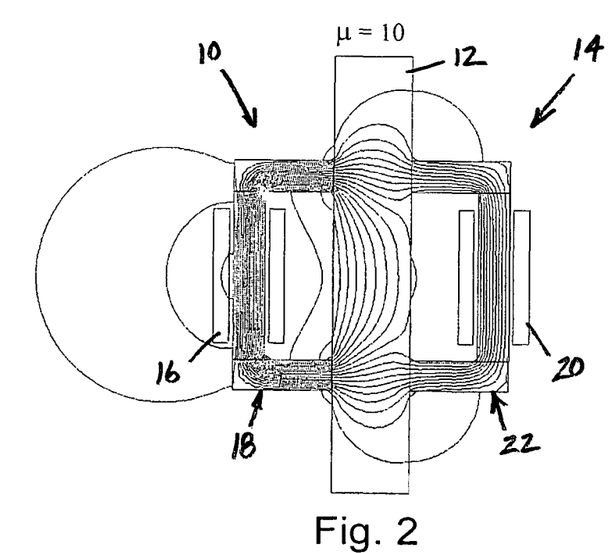
FIG. 2 is a representation of the induction power/data transfer system of FIG. 1 showing the flow of magnetic flux through a barrier made of a material comprising a relative magnetic permeability of around 10.
Figure 3:
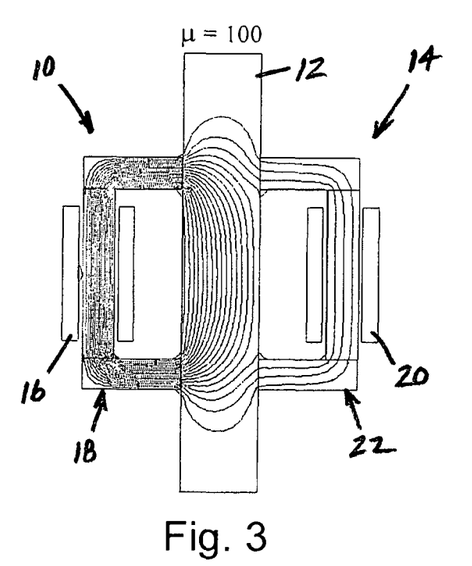
FIG. 3 is a representation of the induction power/data transfer system of FIG. 1 showing the flow of magnetic flux through a barrier made of a material comprising a relative magnetic permeability of around 100.

Although induction data transfer systems work reasonably well with barriers made of many types of materials, induction power transfer systems usually work satisfactorily only with barriers made of materials having relatively low magnetic permeabilities. The reason for this can be explained by reference to FIGS. 2 and 3, which are representations of the induction power transfer system of FIG. 1 showing the paths the magnetic field lines generated by the transmitter 10 follow when the barrier 12 is made of a material having a relative magnetic permeability of around 10 and a material having a relative magnetic permeability of around 100, respectively. As shown in FIG. 2, when the relative magnetic permeability of the barrier 12 is around 10, a substantial portion of the magnetic field lines generated by the transmitter 10 flow through the barrier and into the receiver core 22. As shown in FIG. 3 on the other hand, when the relative magnetic permeability of the barrier 12 is around 100, relatively few of the magnetic field lines flow through the barrier and into the receiver core 22. Instead, most of the magnetic field lines generated by the transmitter 10 "short" through the barrier 12 and return to the transmitter core 18 before reaching the receiver core 22.

The power transfer efficiency of an induction power transfer system is directly proportional to the amount of the magnetic flux generated by the transmitter which flows through the receiver core. The amount of magnetic flux in the receiver core in turn is proportional to the number of magnetic field lines which pass through the transverse cross section of the receiver core. Comparing FIG. 2 with FIG. 3, therefore, one can see that the amount of magnetic flux in the receiver core 22 when the relative magnetic permeability of the barrier 12 is around 10 is significantly greater than the amount of magnetic flux in the receiver core 22 when the relative magnetic permeability of the barrier is around 100. Therefore, the power transfer efficiency of the induction power transfer system will be greater when the barrier 12 is made of a material having a relatively low magnetic permeability.

Figure 4:
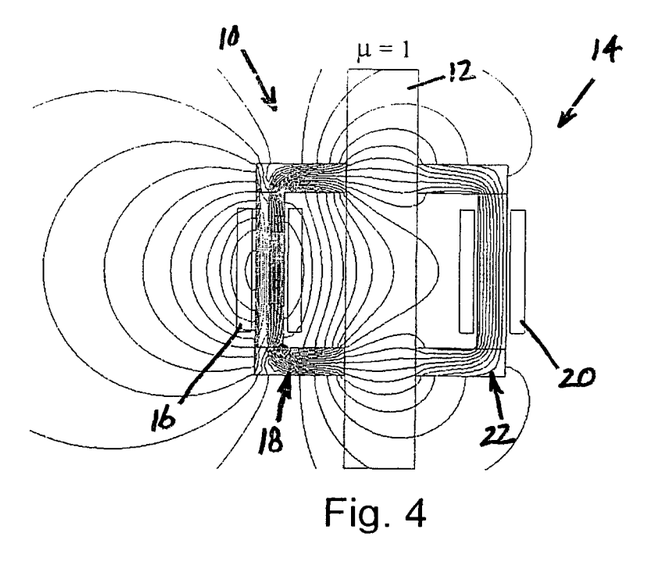
FIG. 4 is a representation of the induction power/data transfer system of FIG. 1 showing the flow of magnetic flux through a barrier made of a material comprising a relative magnetic permeability of around 1.

However, the power transfer efficiency does not continue to increase as the magnetic permeability of the barrier decreases. FIG. 4 is a representation of the induction power transfer system of FIG. 1 showing the paths the magnetic field lines generated by the transmitter 10 follow when the barrier 12 is made of a material having a relative magnetic permeability of around 1. Comparing FIGS. 2 and 4, one can see that when the barrier 12 is made of a material having a relative magnetic permeability of around 1, a smaller proportion of the magnetic flux generated by the transmitter 10 is coupled into the receiver core 22 than in the case when the barrier is made of a material having a relative magnetic permeability of around 10. Therefore, the power transfer efficiency of the system in which the barrier comprises a relative magnetic permeability of around 1 is less than the power transfer efficiency of the system in which the barrier comprises a relative magnetic permeability of around 10.

However, in many applications in which wireless induction power transfer systems would be beneficial, the barriers are made from materials having relatively high magnetic permeabilities. For example, in the subsea oil and gas production industry, electrically powered devices such as sensors, transmitters and actuators are sometimes positioned inside the production equipment components, such as wellhead housings, christmas tree flow lines and valve actuators, in order to monitor and control the flow of fluids through the components. Although power for these electrically powered devices may be provided by internal batteries or external power supplies, batteries lose charge over time and external power supplies require the drilling of holes through the components to accommodate pass-through connectors, and such holes are undesirable when the pressure integrity of the components must be assured.

Therefore, a wireless induction power transfer system for powering devices positioned inside subsea hydrocarbon production equipment components would be beneficial. However, many of the common materials used to manufacture these components, such as 4130, X65, Super Duplex and 1010 steel, have relative permeabilities near 1000. Consequently, the power transfer efficiencies for an induction power transfer system for use with these components would likely be only a small fraction of a percent. As a result, induction power transfer systems are not practical for use with such components.

In other applications in which wireless induction power transfer systems are currently employed, the power transfer efficiencies are less than ideal because the barriers are made from very low magnetic permeability materials. For example, cordless charging stations employing wireless induction power transfer systems have been developed to recharge a number of portable devices, such as cell phones, personal media players and cameras. However, these devices commonly comprise housings made of very low magnetic permeability materials, such as plastic. As a result, the power transfer efficiency of the charging station is relatively low. Consequently, a relatively long time is required to fully charge the device and the charging efficiency is substantially lowered.

SUMMARY OF THE INVENTION

In accordance with the present invention, these and other limitations in the prior art are addressed by providing a method for increasing the power transfer efficiency of a wireless induction power and/or data transfer system comprising a magnetic field transmitter which is positioned on a first side of a barrier and a magnetic field receiver which is positioned on a second side of the barrier opposite the first side. The method comprises disposing at least one flux flow member in or adjacent the barrier at least partially between the transmitter and the receiver. The flux flow member comprises a magnetic permeability different from a magnetic permeability of the barrier. Thus, the flux flow member increases the amount of magnetic flux generated by the transmitter which is coupled through the barrier and into the receiver.

In accordance with one embodiment of the invention, the at least one flux flow member comprises a magnetic permeability lower than the magnetic permeability of the barrier, the transmitter comprises two transmitter poles, and the step of disposing at least one flux flow member in or adjacent the barrier comprises incorporating the flux flow member into the barrier such that at least a portion of the flux flow member is positioned between the transmitter poles. In this manner, the flux flow member inhibits the magnetic flux generated by the transmitter from shorting through the barrier between the transmitter poles.

In this embodiment, the flux flow member may comprise a thickness which is approximately the same as a thickness of the barrier at an interface between the barrier and the flux flow member.

In accordance with another embodiment of the invention, the flux flow member comprises an elongated member which is positioned between the transmitter poles. In this embodiment, the flux flow member may extend through the barrier generally perpendicular to the transmitter poles. In addition, the flux flow member may comprise a length which is sufficient to prevent the magnetic flux generated by the transmitter from shorting through the barrier around the ends of the flux flow member. Furthermore, the flux flow member may conform to the shape of the barrier. Also, the flux flow member may conform to the cross sectional configuration of the barrier.

In accordance with yet another embodiment of the invention, the flux flow member comprises at least a generally straight first portion which is positioned between the transmitter poles. In this embodiment, the flux flow member may also comprise at least a second portion which is positioned around the first portion and both of the transmitter poles.

In accordance with a further embodiment of the invention, the at least one flux flow member comprises a first flux flow member which is positioned around one of the transmitter poles. In this embodiment, the at least one flux flow member may also comprise a second flux flow member which is positioned around the other of the transmitter poles.

In accordance with still another embodiment of the invention, the flux flow member comprises a first hole which is aligned with one of the transmitter poles. In this embodiment, the flux flow member may also comprise a second hole which is aligned with the other of the transmitter poles.

In any of the above embodiments, the step of incorporating the flux flow member into the barrier may comprise forming the flux flow member in a desired shape, forming a corresponding opening in the barrier, and securing the flux flow member to the barrier in or over the opening. The step of securing the flux flow member to the barrier may comprise welding the flux flow member to the barrier.

In accordance with another embodiment of the invention, the step of incorporating the flux flow member into the barrier comprises providing the barrier in separate barrier sections and welding the barrier sections together. In this embodiment, the flux flow member comprises the resulting weld bead.

In accordance with yet another embodiment of the invention, the at least one flux flow member comprises a magnetic permeability greater than the magnetic permeability of the barrier, the transmitter includes two transmitter poles, the receiver comprises two receiver poles which are generally aligned with the transmitter poles, and the step of disposing at least one flux flow member in or adjacent the barrier comprises incorporating the flux flow member into the barrier between a first transmitter pole and a first receiver pole and between a second transmitter pole and a second receiver pole. In this manner, the flux flow member facilitates the flow of magnetic flux between the transmitter poles and the receiver poles.

In the above embodiment, the step of incorporating the at least one flux flow member into the barrier may comprise incorporating a first flux flow member into the barrier between the first transmitter pole and the first receiver pole and incorporating a second flux flow member into the barrier between the second transmitter pole and the second receiver pole.

In accordance with another embodiment of the invention, the barrier comprises a first housing in which the transmitter is located and a second housing in which the receiver is located, and the step of incorporating the first and second flux flow members into the barrier comprises attaching the flux flow members to at least one of the housings.

The present invention is also directed to a barrier which is manufactured or modified in accordance with the methods described above in order to increase the power transfer efficiency of a wireless induction power and/or data transfer system that is installed across the barrier. The invention is further directed to a wireless induction power and/or data transfer system which includes a barrier that is manufactured or modified in accordance with the methods described above in order to increase the power transfer efficiency of the system.

Thus, the present invention provides an effective method and apparatus for increasing the power transfer efficiency of wireless induction power and/or data transfer systems which are installed across barriers made of relatively high or very low magnetic permeability materials. Thus, the invention enables wireless induction power and/or data transfer systems to be used to power devices which previously could not be practicably powered in this manner.

These and other objects and advantages of the present invention will be made apparent from the following detailed description, with reference to the accompanying drawings. In the drawings, the same reference numbers may be used to denote similar components in the various embodiments.

DETAILED DESCRIPTION OF THE INVENTION

The present invention provides an effective method for increasing the power transfer efficiency of induction power and/or data transfer systems which are installed across barriers made of relatively high or very low magnetic permeability materials. Thus, the invention enables induction power transfer systems to be used to power devices which are disposed within structures made of relatively high magnetic permeability materials, such as subsea hydrocarbon production equipment components, ship and submarine hulls, nuclear reactors and pressure vessels. In addition, the invention improves the power transfer efficiency of induction power transfer systems which are used, for example, in charging stations for battery powered devices that comprise housings made of very low magnetic permeability materials, such as plastic.

For purposes of simplicity, the several embodiments of the invention set forth below will be described in the context of the wireless induction power and/or data transfer system shown in FIG. 1. In this illustrative and non-limiting embodiment of an induction power/data transfer system, the transmitter and receiver cores 18, 22 are each shown to comprise a generally C-shaped configuration which is defined by a main portion 28 around which the coil 16, 20 is wound and two leg portions 30 which extend transversely from opposite ends of the main portion. In this example, the leg portions 30 of the transmitter core 18 define the poles of the transmitter 10 and the leg portions of the receiver core 22 define the poles of the receiver 14. However, it should be understood that the present invention may be used with other types of magnetic field transmitters and receivers having different transmitter and receiver cores.

As discussed above in connection with FIGS. 2 and 3, the power transfer efficiency of the representative induction power/data transfer system of FIG. 1 is greater for the barrier which comprises a relative magnetic permeability of around 10 as compared to the barrier which comprises a relative magnetic permeability of around 100. This is due to the fact that, with the higher magnetic permeability barrier, the magnetic flux generated by the transmitter tends to short through the barrier and return to the transmitter before it can reach the receiver. As a result, little of the magnetic flux generated by the transmitter is coupled into the receiver.

Figure 5:
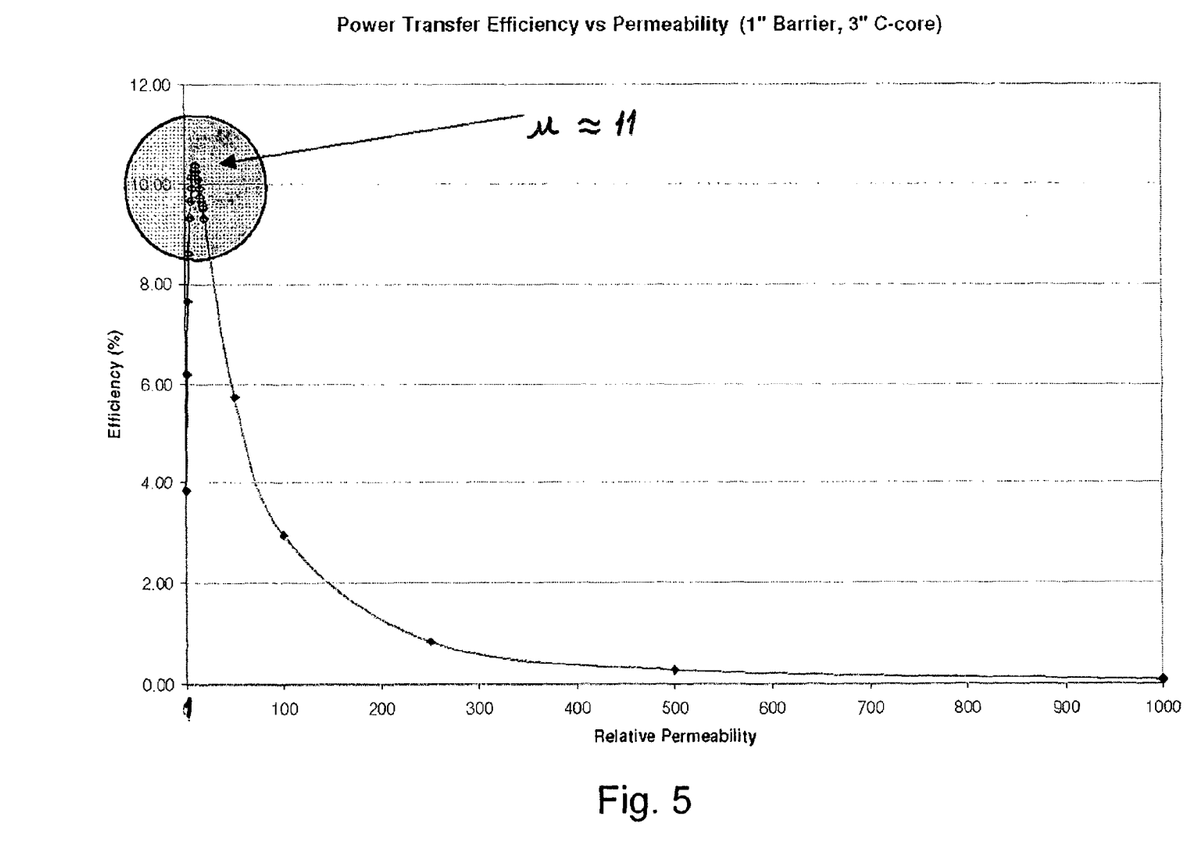
FIG. 5 is a graph of power transfer efficiency versus relative magnetic permeability for a representative induction power transfer system.

Also, as discussed above in connection with FIG. 4, the power transfer efficiency of the representative power/data transfer system of FIG. 1 is lower for the barrier which comprises a relative magnetic permeability of around 1 than for the barrier which comprises a relative magnetic permeability of around 10. This is due to the fact that, with the lower magnetic permeability barrier, the magnetic field lines emanating from the transmitter are quite disordered, and less than optimal magnetic coupling exists between the transmitter and the receiver. As a result, less of the magnetic flux generated by the transmitter is coupled into the receiver. However, as the relative magnetic permeability of the barrier increases, the magnetic field lines become more tightly focused toward the receiver and more of the flux generated by the transmitter is coupled into the receiver. This effect is illustrated in FIG. 5, which is a graph of power transfer efficiency verses barrier permeability for a simulated power transfer system comprising a one-inch thick barrier. As shown in FIG. 5, the power transfer efficiency of this system is about 3.8% when the relative magnetic permeability of the barrier is 1 and peaks at about 10.5% when the relative magnetic permeability of the barrier is around 11.

Of course, the maximum power transfer efficiency which an induction power/data transfer system can achieve depends not only on the magnetic permeability of the barrier, but also on such factors as the thickness of the barrier. However, any induction power/data transfer system comprising a given barrier will have a maximum power transfer efficiency when the barrier comprises a certain magnetic permeability, which may sometimes be referred to hereafter as the "optimal magnetic permeability".

In accordance with the present invention, the power transfer efficiency of an induction power and/or data transfer system is improved by mechanically modifying the barrier to increase the amount of flux generated by the transmitter which is coupled into the receiver. The barrier is mechanically modified by disposing at least one member (which may sometimes be referred to hereafter as a "flux flow member") in or adjacent the barrier at least partially between the transmitter and the receiver. For systems in which the barrier comprises a magnetic permeability greater than its optimal magnetic permeability, a flux flow member having a lower magnetic permeability than that of the barrier is disposed in the barrier to inhibit the magnetic flux generated by the transmitter from shorting through the barrier and back into the transmitter. For systems in which the barrier comprises a magnetic permeability less than its optimal magnetic permeability, a flux flow member having a higher magnetic permeability than that of the barrier is disposed in or adjacent the barrier to better focus the magnetic field lines toward the receiver and thereby couple more of the magnetic flux generated by the transmitter into the receiver.

For a barrier comprising a magnetic permeability greater than its optimal magnetic permeability, the flux flow member or members create one or more regions of lower magnetic permeability which will inhibit the magnetic flux generated by the transmitter from shorting through the barrier between the poles of the transmitter. The region or regions of lower magnetic permeability in effect increase the magnetic reluctance of the shorting path to a level which is sufficient to inhibit the flow of flux between the poles of the transmitter and instead facilitate the flow of flux transversely through the barrier and into the receiver.

One embodiment of the method of the present invention for modifying a barrier comprising a magnetic permeability greater than its optimal magnetic permeability involves incorporating at least one flux flow member into the barrier between the poles of the transmitter. An example of such an embodiment will be described with reference to FIGS. 6 and 7, which depict the representative induction power/data transfer system of FIG. 1 installed across a portion of a representative barrier 12. In this embodiment, an elongated flux flow member 32 is incorporated into the barrier 12 such that, when the transmitter 10 is mounted or otherwise supported relative to the barrier, the flux flow member is positioned between the leg portions 30 of the transmitter core 18 generally perpendicular to the transmitter coil 16. Thus, the flux flow member 32 extends through the barrier 12 generally perpendicular to the leg portions 30 and forms a region of lower magnetic permeability in the barrier which inhibits the magnetic flux $\varphi$ generated by the transmitter 10 from shorting through the barrier from one leg portion to the other.

Figure 6:
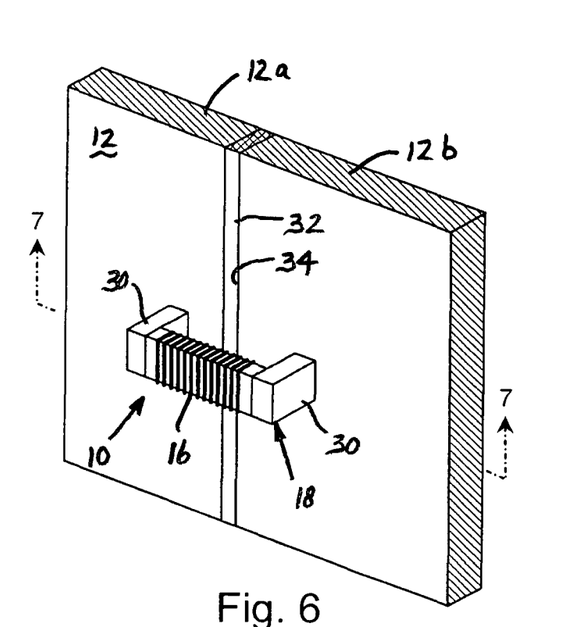
FIG. 6 is a perspective view of the induction power/data transfer system of FIG. 1 illustrating a first embodiment of the method for modifying the barrier to improve power transfer efficiency in accordance with the present invention.
Figure 7:
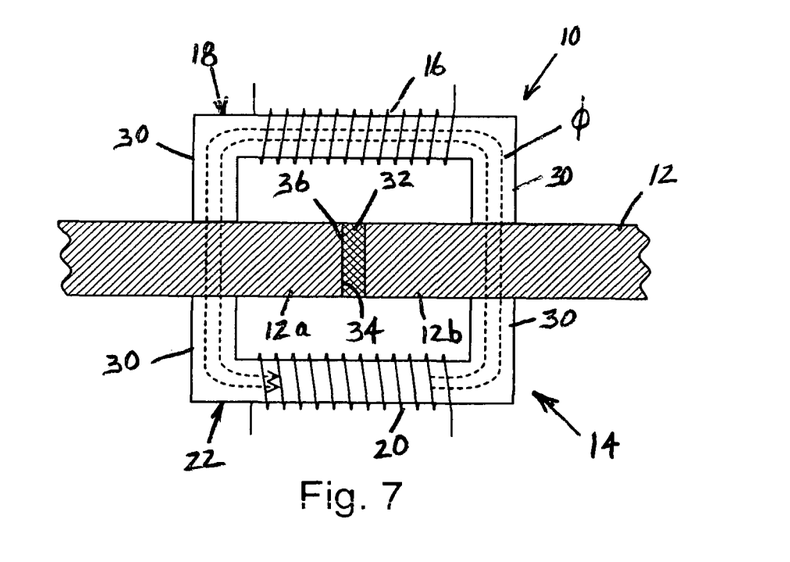
FIG. 7 is a cross sectional representation of the induction power/data transfer system of FIG. 6 taken along line 7-7.

In accordance with one exemplary and non-limiting embodiment of the invention, the flux flow member 32 may be incorporated into the barrier 12 by manufacturing the flux flow member in a desired shape, machining or otherwise forming a corresponding opening 34 in the barrier, and then securing the flux flow member in the opening by suitable means, such as welding. In accordance with another exemplary and non-limiting embodiment of the invention, the flux flow member 32 may be incorporated into the barrier 12 by dividing the barrier into separate barrier sections 12a, 12b and then welding the sections together using a suitable filler material such that the resulting weld bead forms the flux flow member. This latter method is particularly suitable when the barrier 12 is normally provided as separate sections that are conventionally welded together, such as in the case of a pipeline or a ship's hull.

In order to inhibit the magnetic flux generated by the transmitter 10 from shorting through the barrier 12 around the flux flow member 32, the thickness of the flux flow member should be approximately the same as the thickness of the barrier at an interface 36 between the barrier and the flux flow member. In addition, the length of the flux flow member 32 should be sufficient to prevent the magnetic flux from shorting through the barrier 12 around the ends of the flux flow member.

Furthermore, although depicted in FIG. 6 as being straight, the flux flow member 32 may be curved or otherwise configured. Moreover, the flux flow member 32 may be designed to conform to the shape of the barrier 12. For example, in the event the barrier 12 is a tubular member, the flux flow member 32 may conform to the cross-sectional configuration of the barrier and extend partially or completely around the barrier. Thus, consistent with the above discussion, the flux flow member 32 may comprise a circular weld bead which is formed when two sections of pipe are welded together to form a pipeline, in which event the pipeline would comprise the barrier 12.

The flux flow member 32 is ideally made of a material comprising a magnetic permeability sufficiently low to inhibit the magnetic flux generated by the transmitter 10 from shorting through the barrier 12 across the flux flow member. The preferred material for the flux flow member 32 will depend on the environment in which the barrier 12 is employed and the method which is used to attach the flux flow member to the barrier. For example, if the barrier 12 is employed as part of a component that is subjected to high temperatures and pressures, the flux flow member 32 should be made of a material which is capable of withstanding the same temperatures and pressures. Also, if the flux flow member 32 is intended to be welded to the barrier 12, the flux flow member should be made of a material which is capable of being welded to the barrier material. In addition, if the flux flow member 32 is to be formed by the weld bead between two barrier sections, the filler material should be a material which is compatible with the barrier material and will result in a weld bead having a desired magnetic permeability. In one illustrative and non-limiting example of the invention, the barrier is made of 1010 steel having a relative magnetic permeability of around 1000, the flux flow member is made of Inconel™ 625 having a relative magnetic permeability of around 1, and the flux flow member is welded to the barrier using Inconel™ 625 as a filler material.

Figure 8:
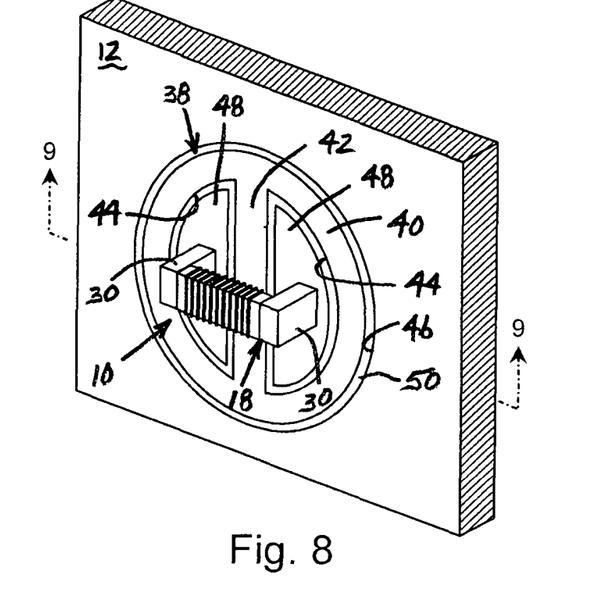
FIG. 8 is a perspective view of the induction power/data transfer system of FIG. 1 illustrating a second embodiment of the method for modifying the barrier to improve power transfer efficiency in accordance with the present invention.
Figure 9:
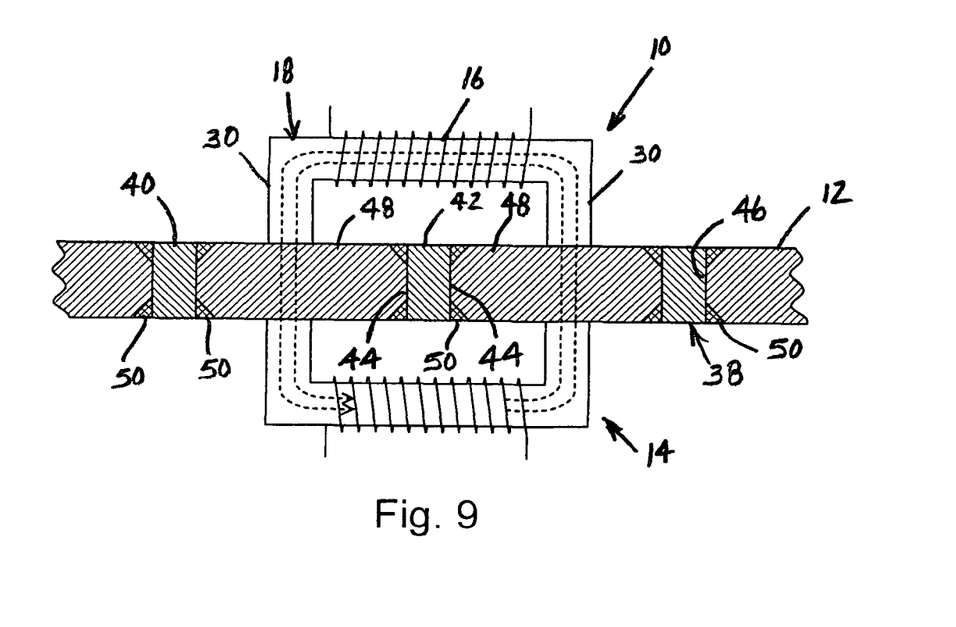
FIG. 9 is a cross sectional representation of the induction power/data transfer system of FIG. 8 taken along line 9-9.

A second embodiment of the method of the present invention for modifying a barrier comprising a magnetic permeability greater than its optimal magnetic permeability is shown in FIGS. 8 and 9. In this embodiment, the flux flow member 38 is shown to comprise a generally "phi"-shaped configuration which includes a ring portion 40 that is bisected by a rail portion 42 to thereby define two semi-circular apertures 44. Also, the transmitter core 18 is positioned relative to flux flow member 38 such that the transmitter coil 16 is generally perpendicular to the rail portion 42 and each leg portion 30 is positioned over a corresponding aperture 44.

The flux flow member 38 may be incorporated into the barrier 12 by any suitable means. In one exemplary and non-limiting embodiment of the invention, a circular opening 46 having approximately the same diameter as the ring portion 40 is machined or otherwise formed in the barrier 12. Two semi-circular filler pieces 48 corresponding to the shape of the apertures 44 are then machined or otherwise formed from the barrier material or another material which has a magnetic permeability sufficiently high to facilitate the flow of flux between the transmitter 10 and the receiver 14. Then, the flux flow member 38, which is machined or otherwise formed from a suitable material having a desired magnetic permeability lower than the magnetic permeability of the barrier 12, is secured in the opening 46 and the filler pieces 48 are secured in the apertures 44. In the event the flux flow member 38 and the filler pieces 48 are secured in the opening 46 and the apertures 44 by welding, the axial ends of the opening and the edges of the filler pieces may be beveled as shown in FIG. 9 to facilitate the formation of appropriate weld beads 50.

Thus, the rail portion 42 of the flux flow member 38 will inhibit the magnetic flux generated by the transmitter 10 from shorting through the barrier 12 from one leg portion 30 of the transmitter core 18 to the other. In addition, the ring portion 40 of the flux flow member 38 will inhibit the magnetic flux generated by the transmitter 10 from shorting through the barrier 12 between the leg portions 30 of the transmitter core 18 around the ends of the rail portion 42.

As shown in FIG. 9, the thickness of the flux flow member 38 may be the same as the thickness of the barrier 12 and the filler pieces 48. However, depending on a particular application, the ring portion 40 and/or the rail portion 42 of the flux flow member 38 may be thicker or thinner than the barrier 12 and/or the filler pieces 48. In the event the ring portion 40 and the rail portion 42 are thinner than the barrier 12 and/or the filler pieces 48, the resulting gaps are ideally filled with a suitable filler material, such as would be used in welding these components together, which has a desired magnetic permeability lower than the magnetic permeability of the barrier material in order to inhibit the magnetic flux generated by the transmitter 10 from shorting through the barrier around the axial ends of the flux flow member.

Figure 10:
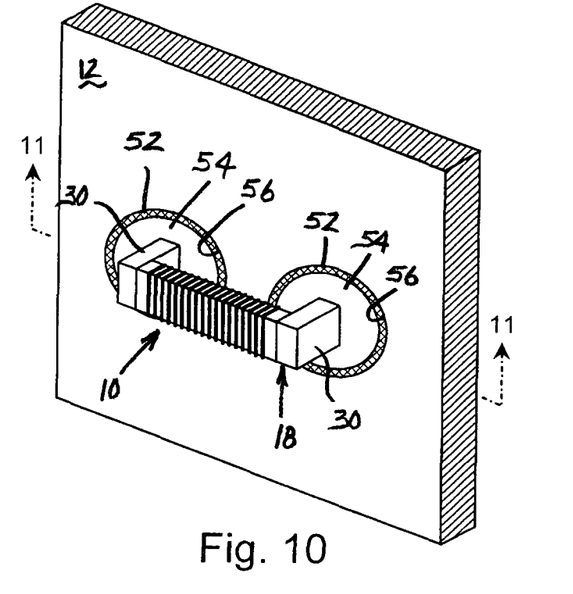
FIG. 10 is a perspective view of the induction power/data transfer system of FIG. 1 illustrating a third embodiment of the method for modifying the barrier to improve power transfer efficiency in accordance with the present invention.
Figure 11:
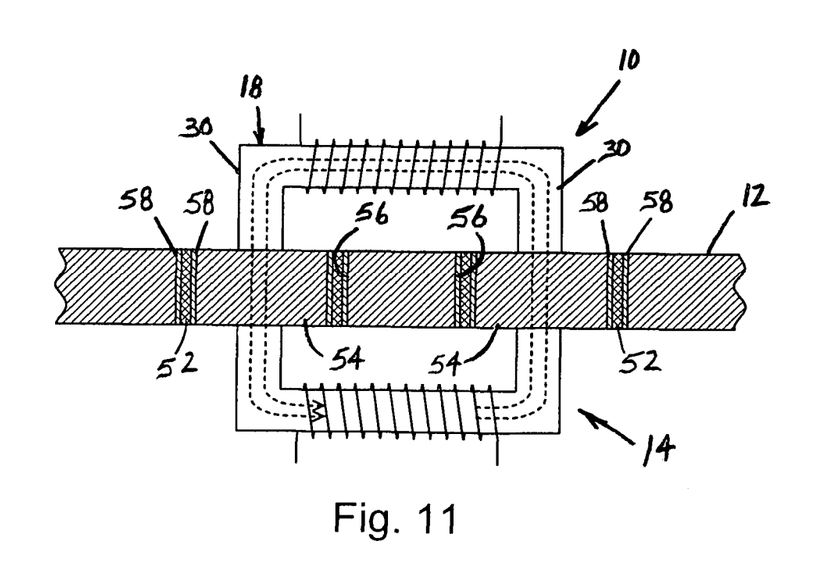
FIG. 11 is a cross sectional representation of the induction power/data transfer system of FIG. 10 taken along line 11-11.

A third embodiment of the method of the present invention for modifying a barrier comprising a magnetic permeability greater than its optimal magnetic permeability is shown in FIGS. 10 and 11. In this embodiment, at least one and preferably two ring-shaped flux flow members 52 are incorporated into the barrier 12, and the transmitter core 18 is positioned such that each leg portion 30 is surrounded by a corresponding flux flow member. Each flux flow member 52 may comprise a weld bead which is deposited between an insert member 54 and a corresponding opening 56 in the barrier 12. The insert members 54 are preferably made of an appropriately high magnetic permeability material, such as the material of the barrier 12, in order to facilitate the flow of flux between the transmitter 10 and the receiver 14. In addition, the weld bead 52 is ideally made using a filler material which has a magnetic permeability sufficiently low to inhibit the magnetic flux generated by the transmitter 10 from shorting through the barrier across the flux flow member. Also, as shown most clearly in FIG. 11, the outer diameter surface of each insert member and/or the inner diameter surface of each opening 56 may be clad prior welding with a cladding material 58 made of an appropriate low permeability material, such as Inconel®, in order to reduce iron dilation of the weld bead 52 and thereby ensure that the magnetic permeability of the weld bead remains sufficiently low.

As an alternative to the embodiment of the invention shown in FIGS. 10 and 11, each flux flow member 52 may comprise a ring-shaped member which is machined or otherwise formed from a suitable material having a desired magnetic permeability lower than the magnetic permeability of the barrier 12. The flux flow members 52 may then be incorporated into the barrier by securing each flux flow member in a corresponding opening 56 such as by welding.

Figure 12:
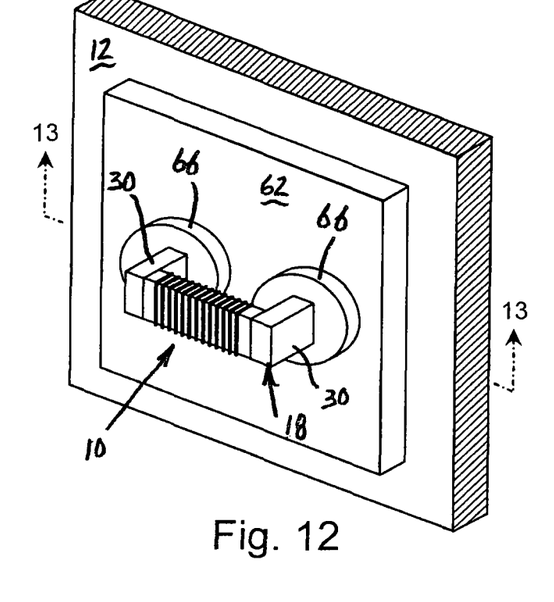
FIG. 12 is a perspective view of the induction power/data transfer system of FIG. 1 illustrating yet another embodiment of the method for modifying the barrier to improve power transfer efficiency in accordance with the present invention.
Figure 13:
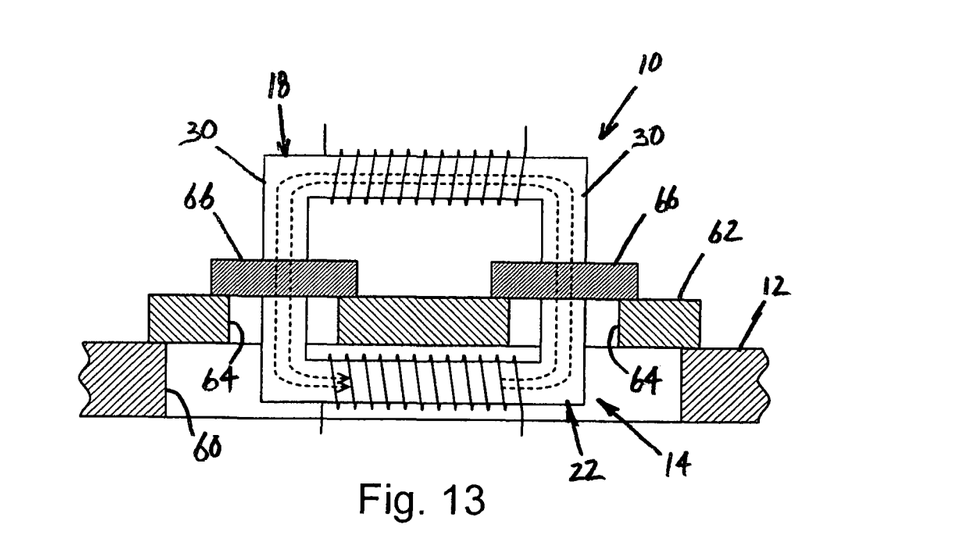
FIG. 13 is a cross sectional representation of the induction power/data transfer system of FIG. 12 taken along line 13-13.

Another embodiment of the method of the present invention for modifying a barrier comprising a magnetic permeability greater than its optimal magnetic permeability is shown in FIGS. 12 and 13. In this embodiment of the invention, an opening 60 is formed in the barrier 12, a flux flow member 62 having two holes 64 formed therein is secured to the barrier over the opening, and two blind flanges 66 are secured to the flux flow member, one over each hole. The transmitter 10 is then positioned such that each leg portion 30 of the transmitter core 18 is located over a corresponding blind flange 66, and the receiver 14 is positioned on the opposite side of the blind flanges such that the leg portions of the receiver core 22 are aligned with the leg portions of the transmitter core.

The blind flanges 66 are optimally made of an appropriately high magnetic permeability material, such as the material of the barrier 12, in order to facilitate the flow of flux between the transmitter 10 and the receiver 14. Also, the flux flow member 62 is ideally made of a material having a magnetic permeability which is sufficiently low to inhibit the magnetic flux generated by the transmitter 10 from shorting through the flux flow member between the blind flanges 66. In addition, the flux flow member 62 may be secured to the barrier 12, and the blind flanges 66 may be secured to the flux flow member, by any suitable means, such as welding or bolting.

In an alternative embodiment of the invention, the flux flow member 62 may comprise two separate members. In this embodiment, each flux flow member 62 would be secured over a corresponding opening 60 in the barrier 12 and would include a hole 64 over which a blind flange 66 would be secured. This embodiment may be more suitable for relatively large transmitters and receivers cores 10, 14 or irregularly shaped barriers 12.

For barriers which comprise magnetic permeabilities less than their optimal magnetic permeabilities, the method of the present invention involves disposing one or more flux flow members in the barrier 12 between the transmitter 10 and the receiver 14 in order to create one or more regions of higher magnetic permeability which will serve to focus the magnetic field lines generated by the transmitter and direct them into the receiver. This will result in a greater amount of the magnetic flux generated by the transmitter 10 being coupled into the receiver 14.

Figure 14:
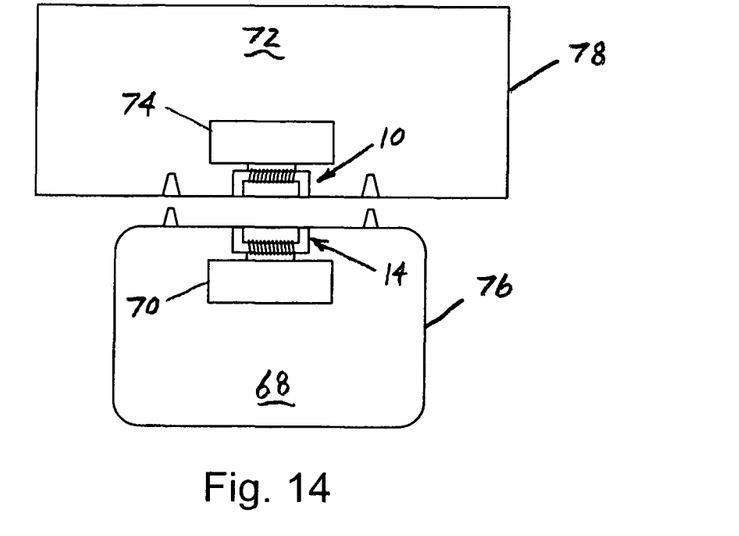
FIG. 14 is a top plan representation of a battery-operated device and associated charging station which are equipped with an induction power/data transfer system.

One embodiment of the method of the present invention for modifying a barrier in this manner will now be described with reference to FIGS. 14 and 15. FIG. 14 is a generalized representation showing a portable device 68 which comprises an on-board battery 70 and a corresponding charging station 72 which includes appropriate electronics 74 for charging the battery when the portable device is engaged with the charging station. In this embodiment of the invention, the portable device 68 and the charging station 72 each include a respective housing 76, 78 which is made of a low magnetic permeability material, and a wireless induction power/data transfer system similar to that shown in FIG. 1 is used to transmit power from the electronics 74 to the battery 70 through the housings in order to charge the battery. The wireless induction power/data transfer system includes a transmitter 10 which is located in the charging station 72 and is connected to the electronics 74 and a receiver 14 which is located in the portable device 68 and is connected to the battery 70.

Figure 15:
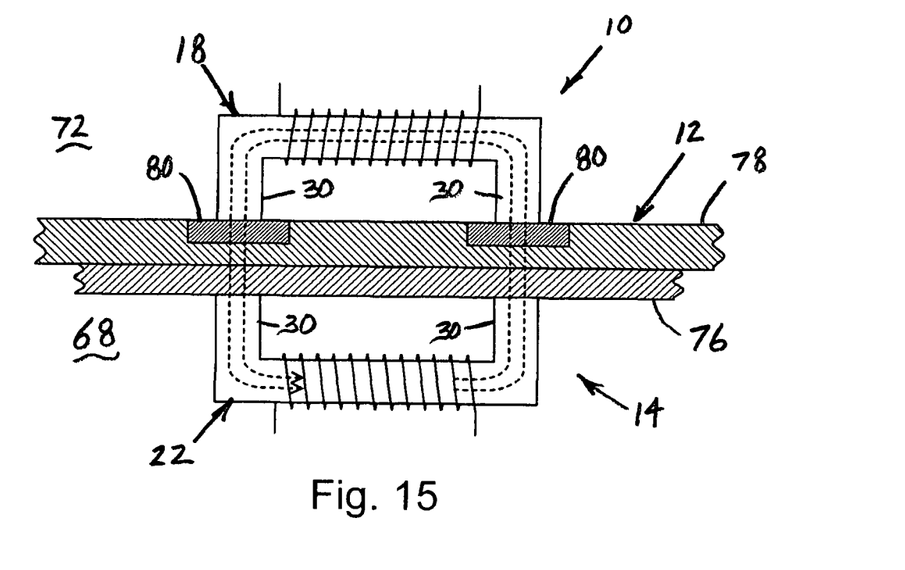
FIG. 15 is a cross sectional representation of the battery-operated device and charging station of FIG. 14 illustrating yet another embodiment of the method for modifying the barrier to improve power transfer efficiency in accordance with the present invention.

Referring to FIG. 15, when the portable device 68 is engaged with the charging station 72, the barrier 12 between the transmitter 10 and the receiver 14 can be considered to comprise the two housings 76, 78. In this embodiment, the barrier 12 is modified by incorporating a single or, as shown in FIG. 15, two individual flux flow members 80 into the barrier between the corresponding leg portions 30 of the transmitter and receiver cores 18, 22. In this regard, each flux flow member 80 may be attached to the housing 78 of the charging station 72 in alignment with a corresponding leg portion 30 of the transmitter core 18. Alternatively, the flux flow members 80 may be attached to the housing 76 of the portable device 68 in alignment with the leg portions 30 of the receiver core 22.

The flux flow members 80 are designed to facilitate the flow of flux through the portions of the housings 76, 78 which are located between the corresponding legs 30 of the transmitter and receiver cores 18, 22. The shape and preferred magnetic permeability of the flux flow members 80 will therefore depend in large part on the shape and material of the housings 76, 78. For a given barrier 12, the shape and preferred magnetic permeability of the flux flow members 80 can be determined empirically or by using a known magnetic circuit simulation program.

The present invention also comprises a barrier which is manufactured or modified in accordance with the methods described above in order to increase the power transfer efficiency of a wireless induction power and/or data transfer system that is installed across the barrier. The invention further comprises a wireless induction power and/or data transfer system which includes a barrier that is manufactured or modified in accordance with the methods described above in order to increase the power transfer efficiency of the system.

It should be recognized that, while the present invention has been described in relation to the preferred embodiments thereof, those skilled in the art may develop a wide variation of structural and operational details without departing from the principles of the invention. For example, the various features shown in the different embodiments may be combined in a manner not illustrated above. Therefore, the appended claims are to be construed to cover all equivalents falling within the true scope and spirit of the invention.

What is claimed is:

1. A method for increasing the power transfer efficiency of a wireless induction power and/or data transfer system comprising: a magnetic field transmitter which is positioned on a first side of a barrier and a magnetic field receiver which is positioned on a second side of the barrier opposite the first side, the method comprising:
   disposing at least one flux flow member in the barrier at least partially between the transmitter and the receiver, the flux flow member being separate from the transmitter and the receiver and comprising a magnetic permeability lower than a magnetic permeability of the barrier;
   wherein the transmitter comprises two transmitter poles and the step of disposing at least one flux flow member in the barrier comprises incorporating the flux flow member into the barrier such that at least a portion of the flux flow member is positioned between the transmitter poles;
   wherein the flux flow member inhibits the magnetic flux generated by the transmitter from shorting through the barrier between the transmitter poles; and
   wherein the flux flow member increases the amount of magnetic flux generated by the transmitter which is coupled through the barrier and into the receiver.

2. The method of claim 1, wherein the flux flow member comprises a thickness which is approximately the same as a thickness of the barrier at an interface between the barrier and the flux flow member.

3. The method of claim 1, wherein the flux flow member comprises an elongated member which is positioned between the transmitter poles.

4. The method of claim 3, wherein the flux flow member extends through the barrier generally perpendicular to the transmitter poles.

5. The method of claim 4, wherein the flux flow member comprises a length which is sufficient to prevent the magnetic flux generated by the transmitter from shorting through the barrier around the ends of the flux flow member.

6. The method of claim 4, wherein the flux flow member conforms to the shape of the barrier.

7. The method of claim 4, wherein the flux flow member conforms to the cross sectional configuration of the barrier.

8. The method of claim 1, wherein the flux flow member comprises at least a generally straight first portion which is positioned between the transmitter poles.

9. The method of claim 8, wherein the flux flow member comprises at least a second portion which is positioned around the first portion and both of the transmitter poles.

10. The method of claim 1, wherein the at least one flux flow member comprises a first flux flow member which is positioned around one of the transmitter poles.

11. The method of claim 10, wherein the at least one flux flow member comprises a second flux flow member which is positioned around the other of the transmitter poles.

12. The method of claim 1, wherein the flux flow member comprises a first hole which is aligned with one of the transmitter poles.

13. The method of claim 12, wherein the flux flow member comprises a second hole which is aligned with the other of the transmitter poles.

14. The method of claim 1, wherein the step of incorporating the flux flow member into the barrier comprises:
   forming the flux flow member in a desired shape;
   forming a corresponding opening in the barrier; and
   securing the flux flow member to the barrier in or over the opening.

15. The method of claim 14, wherein the step of securing the flux flow member to the barrier comprises welding the flux flow member to the barrier.

16. The method of claim 1, wherein the step of incorporating the flux flow member into the barrier comprises:
   providing the barrier in separate barrier sections; and
      welding the barrier sections together;
   wherein the flux flow member comprises the resulting weld bead.

17. A wireless induction power and/or data transfer system which comprises:
   a magnetic field transmitter which is positioned on a first side of a barrier, the magnetic field transmitter comprising two transmitter poles;
   a magnetic field receiver which is positioned on a second side of the barrier opposite the first side; and
   at least one flux flow member which is disposed in the barrier at least partially between the transmitter and the receiver, the flux flow member being separate from the transmitter and the receiver and comprising a magnetic permeability lower than a magnetic permeability of the barrier;
   wherein at least a portion of the flux flow member is positioned between the transmitter poles; and
   wherein the flux flow member increases the amount of magnetic flux generated by the transmitter which is coupled through the barrier and into the receiver.

18. The system of claim 17, wherein the flux flow member comprises a thickness which is approximately the same as a thickness of the barrier at an interface between the barrier and the flux flow member.

19. The system of claim 17, wherein the flux flow member comprises an elongated member which is positioned between the transmitter poles.

20. The system of claim 19, wherein the flux flow member extends through the barrier generally perpendicular to the transmitter poles.

21. The system of claim 20, wherein the flux flow member comprises a length which is sufficient to prevent the magnetic flux generated by the transmitter from shorting through the barrier around the ends of the flux flow member.

22. The system of claim 20, wherein the flux flow member conforms to the shape of the barrier.

23. The system of claim 20, wherein the flux flow member conforms to the cross sectional configuration of the barrier.

24. The system of claim 17, wherein the flux flow member comprises at least a generally straight first portion which is positioned between the transmitter poles.

25. The system of claim 24, wherein the flux flow member comprises at least a second portion which is positioned around the first portion and both of the transmitter poles.

26. The system of claim 17, wherein the at least one flux flow member comprises a first flux flow member which is positioned around one of the transmitter poles.

27. The system of claim 26, wherein the at least one flux flow member comprises a second flux flow member which is positioned around the other of the transmitter poles.

28. The system of claim 17, wherein the flux flow member comprises a first hole which is aligned with one of the transmitter poles.

29. The system of claim 28, wherein the flux flow member comprises a second hole which is aligned with the other of the transmitter poles.

30. The system of claim 17, wherein the barrier comprises an opening and the flux flow member is secured to the barrier in or over the opening.

31. The system of claim 30, wherein the step of securing the flux flow member to the barrier comprises welding the flux flow member is welded to the barrier.

32. The system of claim 17, wherein the barrier comprises separate barrier sections and the flux flow member comprises a weld bead which is formed by welding the barrier sections together.

\* \* \* \* \*